O. F. ORNDOFF.
RAKE TOOTH POINT.
APPLICATION FILED JUNE 15, 1907.
910,306.
Patented Jan. 19, 1909.
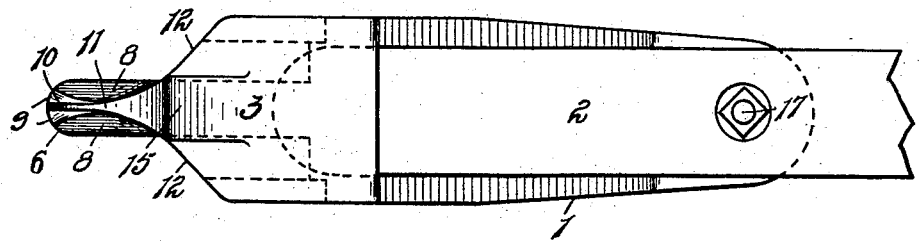
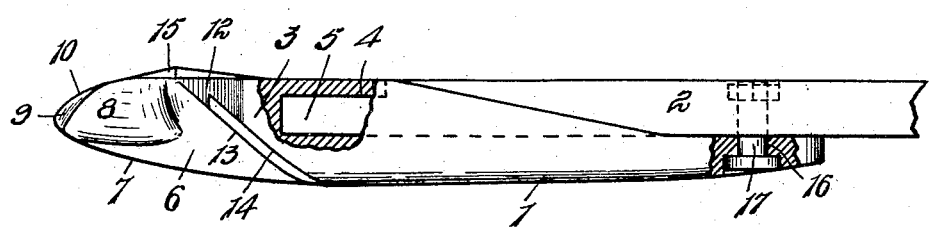
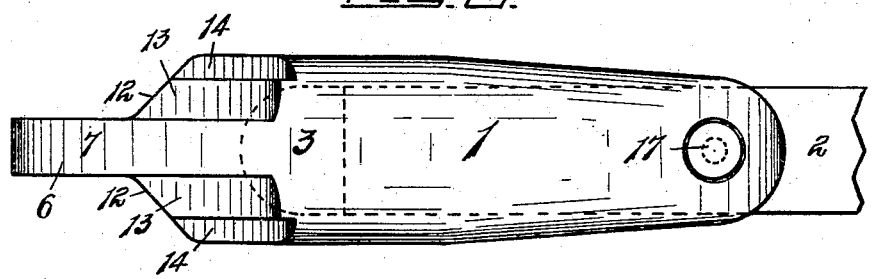
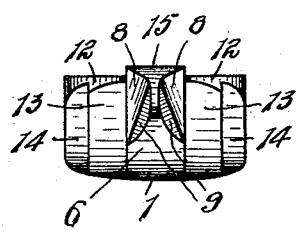
Witnesses:
Helen V. Reap.
Catharine Z. Crenshaw.
Inventor:
Oscar F. Orndoff.
By,
F. J. Harson & Co.
Attorneys.
THE NORRIS PETERS CO., WASHINGTON, D. C.

UNITED STATES PATENT OFFICE.

OSCAR F. ORNDOFF, OF HARVEYS, PENNSYLVANIA.

RAKE-TOOTH POINT.

No. 910,306.  Specification of Letters Patent.  Patented Jan. 19, 1909.

Application filed June 15, 1907. Serial No. 379,156.

*To all whom it may concern:*

Be it known that I, OSCAR F. ORNDOFF, a citizen of the United States, residing at Harveys, in the county of Greene and State of Pennsylvania, have invented new and useful Improvements in Rake-Teeth Points, of which the following is a specification.

This invention relates to new and useful improvements in rake teeth points and particularly to the class of teeth used on rakes commonly known as sweep rakes, in which the gathering of hay is effected by means of their teeth projecting forwardly from rake head.

The object of my invention is to provide a point or tip for the end of a rake tooth that will be a simple, inexpensive, durable and efficient device of this character which will be effective for the purpose designed.

Further objects and advantages of this invention will appear in the following specification and the novel features thereof will be finally pointed out in the appended claims.

Referring to the accompanying drawings forming a part of this specification, wherein like characters of reference denote similar parts throughout the several views: Figure 1, is a top plan view of my improved rake tooth point or tip secured to the end of a rake tooth. Fig. 2, is a side elevation thereof. Fig. 3, is a bottom plan view of Fig. 2. Fig. 4 is a front view.

In carrying out the aim of my invention I provide a tooth or dip made of suitable material and constructed to provide a longitudinally and transversely curved retaining base 1, adapted to protect the bottom portion of the rake tooth 2, near the point and terminates in a head 3, which is provided with the tooth socket 4, for receiving the end extremity 5, of the rake tooth 2. This head 3, it will be observed is provided with the centrally located and forwardly extending nose or advance 6, the lower face of which is curved upward and forward as at 7, forming a continuation of the longitudinally curved retaining base 1, as clearly shown in the several views of the drawings. This nose 6, has its side faces 8 and 9, inclined toward the top to form the downwardly curved top face 10, which gradually widens from the point 11, to form the inclined upper edges 12, of the head 3. The head 3, on the opposite sides of the nose 6, is formed or provided with the upwardly inclined faces 13 and 14, to form shoulders as clearly shown in Fig. 2, of the drawings. The head 3, is further provided with the raised portion 15. which allows the hay to be easily carried past the inclined edges 12, to obviate clogging or gathering thereof at this point when the hay is wet or heavy.

The curved retaining base 1, is provided near its end with an opening or perforation 16, through which passes a bolt or other suitable securing device 17, that will serve to firmly hold the metal point or tip to the end of the wooden tooth 2.

In gathering hay the lower curved surface 7, of the nose 6, engages the surface of the ground or earth and owing to the shape and form thereof gathers the hay more easily and cleanly than the ordinary point now in use and further should the point start into the ground which is common with rake teeth of this character it is not necessary to stop the team and pull the teeth out of the ground by backing up for just as soon as the point has entered the earth its full length the inclined edges 13 and 14, forming shoulders engage the upper surface of the earth and have a tendency to push the point 6, out of the ground without ever having to stop the team.

Another advantage of my improved point or tip is that should the advance point or nose 6, become broken in any way it is not necessary to replace a new point or tip on the rake tooth as the shoulders 13 and 14 will fully protect the end of the rake tooth and serve to keep the point or tip from working into the earth too far. The advance point or nose 6, is of great assistance in gathering the hay owing to the fact that it lies close to the ground and easily finds its way under the hay as the rake teeth advance thus gradually raising the load until it is safely deposited on the rake tooth 2.

It will be readily understood that the precise details of construction set out above and illustrated in the drawings may be varied slightly without departing from the spirit and scope of my invention.

Having fully described my invention, what I claim is:

1. A tooth tip, comprising a body portion having upwardly and forwardly inclined faces to form shoulders from which forwardly extends the narrow nose or advance portion.

2. A rake tooth tip comprising a metal member having an advance point, upwardly and forwardly inclined faces formed upon opposite sides of said point to serve as shoulders, a socket formed within said metal member to receive the end of a rake tooth, and a projecting perforated retaining base having its lower surface longitudinally and transversely curved by means of which said tip may be secured to a rake tooth.

3. A rake tooth tip, comprising a body portion having upwardly and forwardly inclined faces to form shoulders, and an advance point extending from said shoulders and a socket formed within said body portion for the reception of the end of a rake tooth.

4. A rake tooth tip composed of suitable material having a narrow forwardly extended nose having convergent faces, a broader portion having upwardly and forwardly inclined faces to form shoulders from which forwardly extends said nose, a socket formed within said broader portion to receive the end of a rake tooth and a rearward extension of the broader portion having its lower surface longitudinally and transversely curved, said rearwardly extending portion being perforated to receive a bolt or other suitable means to fasten the tip to a rake tooth.

In testimony whereof I have signed my name to the specification in the presence of two subscribing witnesses.

OSCAR F. ORNDOFF.

Witnesses:
 ANNA BURRESS,
 FREDK. J. LARSON.